(12) United States Patent
Takahashi

(10) Patent No.: US 11,178,440 B2
(45) Date of Patent: *Nov. 16, 2021

(54) DATA PROCESSING APPARATUS AND DATA PROCESSING METHOD

(71) Applicant: Saturn Licensing LLC, New York, NY (US)

(72) Inventor: Kazuyuki Takahashi, Chiba (JP)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/939,902

(22) Filed: Jul. 27, 2020

(65) Prior Publication Data

US 2020/0359071 A1  Nov. 12, 2020

Related U.S. Application Data

(63) Continuation of application No. 16/372,154, filed on Apr. 1, 2019, now Pat. No. 10,750,221, which is a
(Continued)

(30) Foreign Application Priority Data

Sep. 30, 2015 (JP) .............................. JP2015-194552

(51) Int. Cl.
*H04L 7/00* (2006.01)
*H04L 27/26* (2006.01)
(Continued)

(52) U.S. Cl.
CPC ............ *H04N 21/242* (2013.01); *G04G 5/00* (2013.01); *H04H 60/40* (2013.01); *H04H 60/80* (2013.01);
(Continued)

(58) Field of Classification Search
CPC . H04N 21/242; H04L 7/0033; H04L 27/2656; H04L 27/2675
See application file for complete search history.

(56) References Cited

U.S. PATENT DOCUMENTS

2004/0095512 A1* 5/2004 Miyake ................ H04N 21/436
348/725
2007/0076764 A1* 4/2007 Kawada ........... H04N 21/23406
370/503
(Continued)

FOREIGN PATENT DOCUMENTS

CN  101926146 A  12/2010
CN  102132510 A   7/2011
(Continued)

OTHER PUBLICATIONS

International Search Report dated Dec. 13, 2016, in PCT/JP2016/077396, filed Sep. 16, 2016.
(Continued)

*Primary Examiner* — Jaison Joseph
(74) *Attorney, Agent, or Firm* — Oblon, McClelland, Maier & Neustadt, L.L.P.

(57) ABSTRACT

The present technology relates to a data processing apparatus and a data processing method that enable correct clock synchronization by use of clock information. The data processing apparatus receives a digital broadcast signal so as to process content included in the digital broadcast signal and clock information also included therein for use in presentation synchronization on the content and sends via a transmission path the processed content and clock information to another data processing apparatus that presents the received content. On the other hand, the another data processing apparatus receives via the transmission path the content and clock information sent from the data processing apparatus so as to process presentation synchronization on
(Continued)

the received content on the basis of the received clock information. The present technology is applicable to data processing apparatuses configured to process content, for example.

29 Claims, 18 Drawing Sheets

Related U.S. Application Data continuation of application No. 15/740,544, filed as application No. PCT/JP2016/077396 on Sep. 16, 2016, now Pat. No. 10,291,945.

(51) Int. Cl.
| | |
|---|---|
| H04N 21/242 | (2011.01) |
| H04N 21/236 | (2011.01) |
| H04H 60/40 | (2008.01) |
| H04H 60/80 | (2008.01) |
| H04N 21/8547 | (2011.01) |
| H04N 21/43 | (2011.01) |
| G04G 5/00 | (2013.01) |
| H04J 3/06 | (2006.01) |

(52) U.S. Cl.
CPC ....... *H04N 21/236* (2013.01); *H04N 21/4305* (2013.01); *H04N 21/8547* (2013.01); *H04J 3/0664* (2013.01); *H04L 7/0033* (2013.01); *H04L 27/2656* (2013.01); *H04L 27/2675* (2013.01)

(56) References Cited

U.S. PATENT DOCUMENTS

| | | |
|---|---|---|
| 2007/0286245 A1 | 12/2007 | Yamada |
| 2015/0010018 A1 | 1/2015 | Yang et al. |
| 2016/0241925 A1* | 8/2016 | Iguchi .............. H04N 21/64322 |
| 2016/0261358 A1 | 9/2016 | Iguchi et al. |
| 2016/0359603 A1* | 12/2016 | Fay .................... H04N 21/4622 |
| 2017/0164017 A1* | 6/2017 | Hwang ............ H04N 21/64322 |
| 2018/0213270 A1* | 7/2018 | Ng ..................... H04N 21/4382 |

FOREIGN PATENT DOCUMENTS

| | | |
|---|---|---|
| CN | 104836630 A | 8/2015 |
| JP | 2007-104085 A | 4/2007 |
| JP | 2007-274607 A | 10/2007 |
| JP | 2015-104122 A | 6/2015 |
| WO | 02/082807 A1 | 10/2002 |
| WO | 2015/068352 A1 | 5/2015 |

OTHER PUBLICATIONS

Association of Radio Industries and Businesses, "MMT-Based Media Transport Scheme in Digital Broadcasting Systems, ARIB STD-B60", ver.1.0, Jul. 31, 2014, 20 pages, (with English translation).

Association of Radio Industries and Businesses, "Transmission System for Advanced Wide Band Digital Satellite Broadcasting, ARIB STD-B44" ver. 2.0-E1, Jul. 31, 2014, 316 pages, (with English translation).

Combined Office Action and Search Report dated Apr. 25, 2019 in Chinese Patent Application No. 2016800055384.4, 17 pages (with Enlgish translation).

Extended European Search Report dated Mar. 18, 2019 in corresponding European Patent Application No. 16851214.3, 9 pages.

Exel Reinhard: "Mitigation of Asymmetric Link Delays in IEEE 1588 Clock Synchronization Systems", IEEE Communications Letters, IEEE Service Center, vol. 18, No. 3, XP011544857, Mar. 1, 2014, pp. 507-510.

IEEE: IEEE Std 1588™-2008, "IEEE Standard for a Precision Clock Synchronization Protocol for Network Measurement and Control Systems, IEEE Instrumentation and Measurement Society", Jul. 24, 2008, pp. 1-269 and cover pages.

* cited by examiner

FIG. 6

| Syntax | # of bits | Format |
|---|---|---|
| L1_Detail_signaling() { | | |
| L1D_version | 4 | uimsbf |
| L1D_num_rf | 3 | uimsbf |
| for L1D_rf_id=1..L1D_num_rf{ | | |
| L1D_rf_frequency | 32 | uimsbf |
| } | | |
| if(L1B_clock_info_flag) { | | |
| PTP_sec | 32 | uimsbf |
| PTP_nanosec | 17 | uimsbf |
| PTP_UTC_offset | 8 | uimsbf |
| } | | |
| ... | | |
| for i=0..L1B_num_subframes{ | | |
| ... | | |
| } | | |
| ... | | |
| } | | |

FIG. 7

CONVERSION FROM PTP TO UTC

- UTC_seconds    = PTP_sec+PTP_UTC_offset
- UTC_fraction   = PTP_nanosec

— UTC_seconds    : SECONDS OF NTP FORMAT
— PTP_sec        : SECONDS OF PTP FORMAT
— UTC_fraction   : SUB-SECONDS OF NTP FORMAT (NTP Timestamp format IS IN UNIT OF $1/2^{32}$ SECOND)
— PTP_nanosec    : NANOSECONDS OF PTP FORMAT (IN UNIT OF $1/10^9$ SECOND (1 ns))
— PTP_UTC_offset : DIFFERENCE BETWEEN PTP AND UTC

FIG. 9

| | | No of bits |
|---|---|---|
| General header | transportSpecific | 4 |
| | messageType | 4 |
| | reserved | 4 |
| | versionPTP | 4 |
| | messageLength | 16 |
| | domainNumber | 8 |
| | reserved | 8 |
| | flagField | 16 |
| | correctionField | 64 |
| | reserved | 32 |
| | sourcePortIdentity | 80 |
| | sequenceID | 16 |
| | controlField | 8 |
| | logMessageInterval | 8 |

FIG.10

| Message_type | Message class | Value(hex) |
|---|---|---|
| Sync | Evnet | 0 |
| Delay_Req | Evnet | 1 |
| Pdelay_Req | Evnet | 2 |
| Pdelay_Resp | Evnet | 3 |
| Reserved | — | 4-7 |
| Follow_Up | General | 8 |
| Delay_Resp | General | 9 |
| Pdelay_Resp_Follow_Up | General | A |
| Announce | General | B |
| Signaling | General | C |
| Management | General | D |
| Reserved | — | E-F |

FIG.11

| Sync message format | | No of bytes |
|---|---|---|
| General header | | 34 |
| Sync message | originTimestamp | 10 |

FIG.12

| Delay_Req message format | | No of bytes |
|---|---|---|
| General header | | 34 |
| Delay_Req message | originTimestamp | 10 |

FIG.13

| Follow_up message format | | |
|---|---|---|
| | | No of bytes |
| General header | | 34 |
| Follow_up message | preciseOriginTimestamp | 10 |

FIG. 14

| Delay_Resp message format | | No of bytes |
|---|---|---|
| General header | | 34 |
| Delay_Resp message | receiveTimestamp | 10 |
| | requestingPortIdentity | 10 |

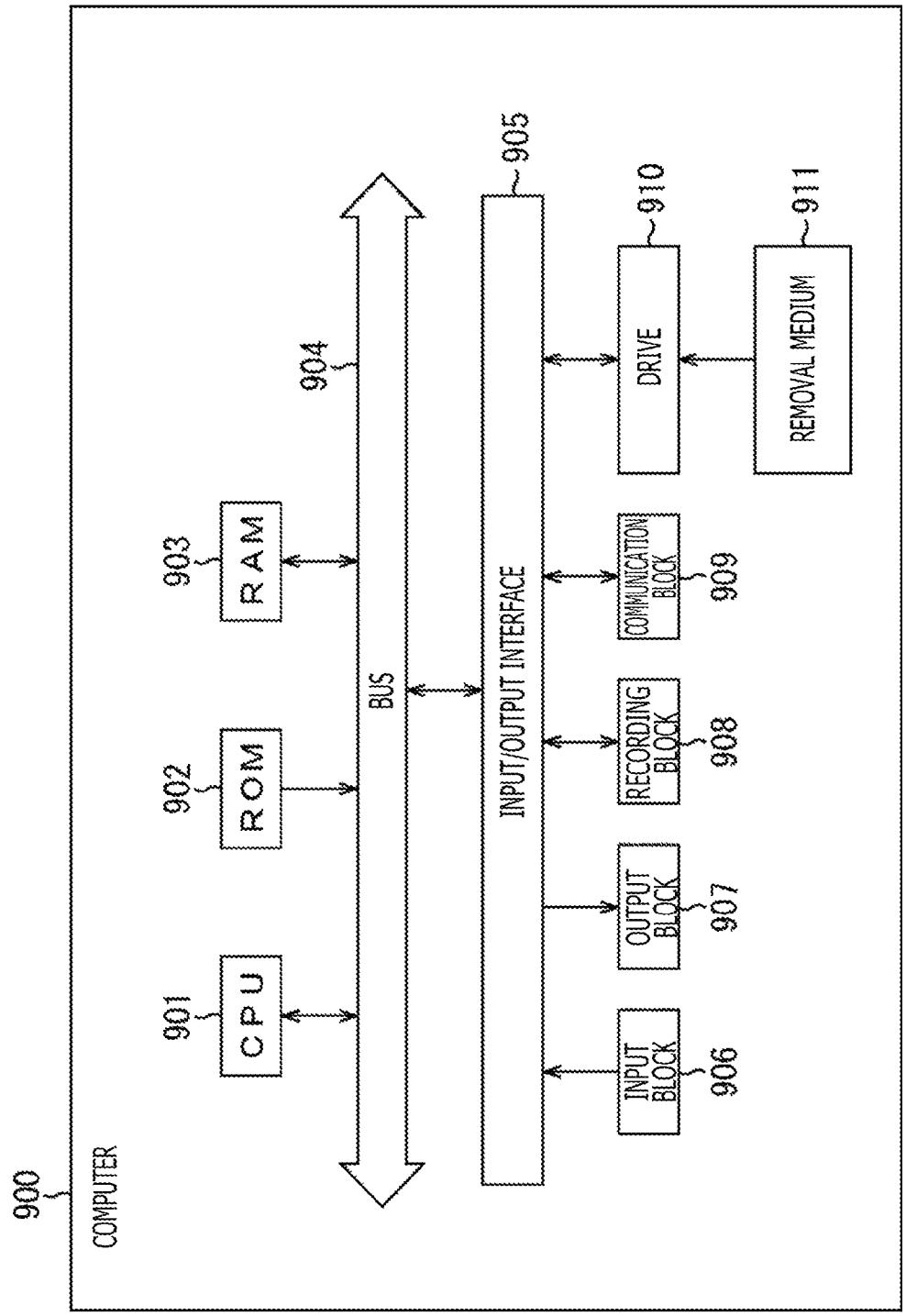

DATA PROCESSING APPARATUS AND DATA PROCESSING METHOD

CROSS-REFERENCE TO RELATED APPLICATIONS

The present application is a continuation of and claims the benefit of priority to U.S. Ser. No. 16/372,154, filed Apr. 1, 2019, which is a continuation of and claims the benefit of priority to U.S. Ser. No. 15/740,544, filed Dec. 28, 2017, now U.S. Pat. No. 10,291,945, issued May 14, 2019, the entire contents of which are incorporated herein by reference. U.S. Ser. No. 15/740,544 is a National Stage Application of PCT/JP2016/077396, filed Sep. 16, 2016, and also claims priority under 35 U.S.C. 119 to Japanese Application No. 2015-194552, filed Sep. 30, 2015. The benefit of priority is claimed to each of the foregoing.

TECHNICAL FIELD

The present technology relates to a data processing apparatus and a data processing method and, more particularly, to a data processing apparatus and a data processing method that enable correct clock synchronization by use of clock information.

BACKGROUND ART

For example, it has been determined that ATSC (Advanced Television Systems Committee) 3.0, one of the next-generation terrestrial broadcasting standards, employs a data transmission scheme mainly using not TS (Transport Stream) packets but UDP/IP, namely, IP (Internet Protocol) packets including UDP (User Datagram Protocol) packets (hereafter referred to as the IP transmission scheme). In addition, it is expected that broadcasting schemes other than the ATSC3.0 will also employ the IP transmission scheme in the future.

It should be noted that, in TS broadcasting, PCR (Program Clock Reference) is transmitted as clock information required for providing synchronization between the sending side and the receiving side (refer to NPL 1 below).

CITATION LIST

Non Patent Literature

[NPL 1]
ARIB STD-B44, Association of Radio Industries and Businesses

SUMMARY

Technical Problem

Meanwhile, in the IP transmission scheme, a method of processing the clock information for providing synchronization between the sending side and the receiving side has not been established, so that, in the redelivery of content, for example, proposals for enabling correct clock synchronization by use of clock information has been asked.

The present technology has been made in view of the above-described circumstances, and it is intended to provide correct clock synchronization by use of clock information.

Solution to Problem

According to a first aspect of the present technology, there is provided a data processing apparatus. This data processing apparatus has a receiving block configured to receive a digital broadcast signal; a processing block configured to process content included in the digital broadcast signal and clock information included therein for use in presentation synchronization on the content; and a sending block configured to send the clock information along with the content to another data processing apparatus that presents the content via a transmission path.

The data processing apparatus of the first aspect of the present technology may be an independent apparatus or an internal block making up an apparatus. A data processing method of the first aspect of the present technology is a data processing method corresponding to the data processing apparatus of the first aspect of the present technology described above.

In the data processing apparatus and the data processing method according to the first aspect of the present technology, a digital broadcast signal is received; content included in the digital broadcast signal and clock information included therein for use in presentation synchronization on the content are processed; and the clock information is sent along with the content to another data processing apparatus that presents the content via a transmission path.

According to a second aspect of the present technology, there is provided a data processing apparatus. This data processing apparatus has a receiving block configured to receive content sent from another data processing apparatus capable of receiving a digital broadcast signal, the content being included in the digital broadcast signal, and clock information included therein for use in presentation synchronization on the content via a transmission path; and a processing block configured to process presentation synchronization on the content on the basis of the clock information.

The data processing apparatus of the second aspect of the present technology may be an independent apparatus or an internal block making up an apparatus. A data processing method of the second aspect of the present technology is a data processing method corresponding to the data processing apparatus of the second aspect of the present technology described above.

In the data processing apparatus and the data processing method according to the second aspect of the present technology, content sent from another data processing apparatus capable of receiving a digital broadcast signal, the content being included in the digital broadcast signal, and clock information included therein for use in presentation synchronization on the content are received via a transmission path; and presentation synchronization on the content is processed on the basis of the clock information.

Advantageous Effects of Invention

According to the first aspect and the second aspect of the present technology, correct clock synchronization can be provided by use of clock information.

It should be noted that the effects described above are not necessarily restricted thereto; for example, any one of the effects described in the present disclosure may be interpreted as an advantageous effect of the present technology.

BRIEF DESCRIPTION OF DRAWINGS

FIG. 6 is a diagram illustrating an example of a syntax of clock information.

FIG. 7 is a diagram describing an example of conversion from PTP to UTC.

FIG. 9 is a diagram illustrating an example of fields included in a General header of a PTP message.

FIG. 10 is a diagram illustrating an example of messageType included in the General header.

FIG. 11 is a diagram illustrating an example of format of a Sync message.

FIG. 12 is a diagram illustrating an example of a format of a Delay_Req message.

FIG. 13 is a diagram illustrating an example of a format of a Follow-up message.

FIG. 14 is a diagram illustrating an example of a format of a Delay_Resp message.

FIG. 18 is a diagram illustrating an example of a configuration of a computer.

DESCRIPTION OF EMBODIMENTS

The following describes embodiments of the present technology with reference to the drawings. It should be noted that the description will be done in the following sequence.
1. System Configuration
2. Clock Synchronization Method Using Clock Information Based on Present Technology
3. Flow of Processing Executed on Sending Side and Receiving Side
4. Variations
5. Configuration of Computer
<1. System Configuration>
(Configuration Example of Transmission System)

Figure 1:
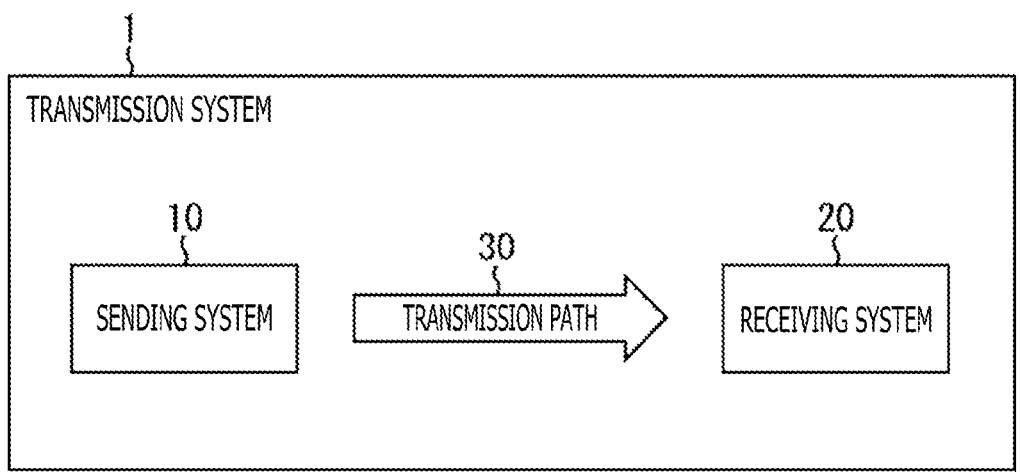
FIG. 1 is a diagram illustrating a configuration of one embodiment of a transmission system to which the present technology is applied.

FIG. 1 is a diagram illustrating a configuration of one embodiment of a transmission system to which the present technology is applied. It should be noted that term "system" denotes a logical aggregation of two or more apparatuses.

As depicted in FIG. 1, a transmission system 1 has a sending system 10 and a receiving system 20. In this transmission system 1, data transmission based on a digital broadcasting standard using an IP transmission scheme such as ATSC (Advanced Television Systems Committee) 3.0 is executed.

The sending system 10 sends a broadcast stream including content such as a television program and so on via a transmission path 30 as a digital broadcast signal.

The receiving system 20 receives a digital broadcast signal sent from the sending system 10 via the transmission path 30, processes the content included in the received broadcast stream, and outputs the processed content.

For example, the receiving system 20 includes two or more apparatuses (a first apparatus and a second apparatus, for example), in which the first apparatus (a master apparatus 211 depicted in FIG. 3 to be described later) receives a digital broadcast signal from the sending system 10 and processes the content included in the received broadcast stream.

Further, the first apparatus sends the content obtained from the broadcast stream to the second apparatus via a network (a transmission path). Then, the second apparatus (a slave apparatus 212 depicted in FIG. 3 to be described later) receives the content such as a television program or the like sent from the first apparatus via the network (the transmission path) and processes (reproduces) the received content.

It should be noted that, in the transmission system 1 depicted in FIG. 1, only one receiving system 20 is illustrated for the convenience of description; however, two or more receiving systems 20 may be arranged such that a digital broadcast signal sent by the sending system 10 can be received by the two or more receiving systems 20 via the transmission path 30 at the same time.

In addition, two or more sending systems 10 may be arranged. Each of the two or more sending systems 10 can send a digital broadcast signal including a broadcast stream in a separate channel, a separate frequency band, for example, and the receiving system 20 can select a channel for receiving the broadcast stream from among the channels of the two or more sending systems 10.

Further, in the transmission system 1 depicted in FIG. 1, the transmission path 30 may be not only a terrestrial broadcasting but also a satellite broadcasting using broadcasting satellite (BS) or a communications satellite (CS) or a cable broadcasting (CATV) using cables.
(Configurational Example of Sending System)

Figure 2:
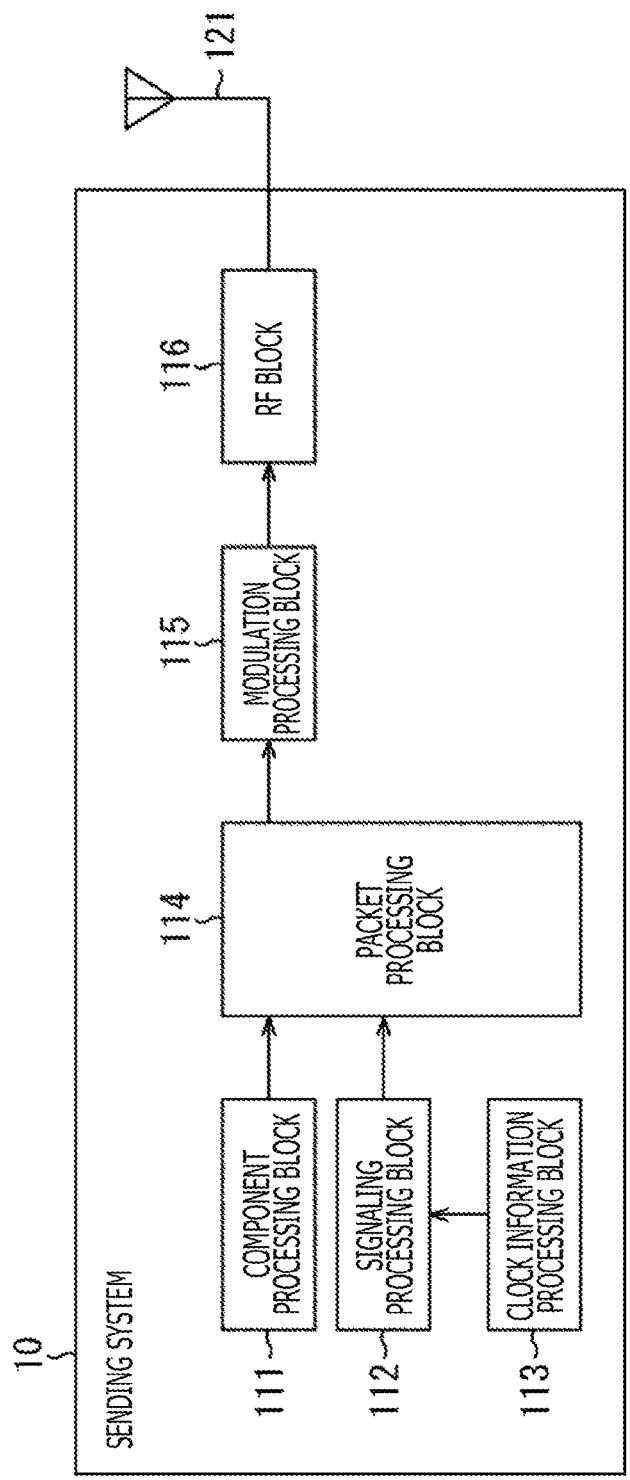
FIG. 2 is a diagram illustrating an example of a configuration of a sending system.

FIG. 2 is a diagram illustrating an example of a configuration of the sending system 10.

As depicted in FIG. 2, the sending system 10 has a component processing block 111, a signaling processing block 112, a clock information processing block 113, a packet processing block 114, a modulation processing block 115, and an RF block 116.

The component processing block 111 obtains the content that is entered therein. Here, the content includes live content (for example, a live broadcast program such as sport live coverage) that is sent from a site of live coverage via a transmission path or a communication line and recorded content (for example, a pre-recorded program such as a drama) accumulated in a storage.

The component processing block 111 processes (encodes, for example) the data of video and audio components that make up content and supplies the processed data to the packet processing block 114.

The signaling processing block 112 generates signaling and processes the generated signaling, supplying the processed signaling to the packet processing block 114. Here, for example, ATSC3.0 assumes that LLS (Link Layer Signaling) and SLS (Service Layer Signaling) be specified as signaling, so that, in accordance with the information described in the LLS signaling obtained in precedence, the SLS signaling for each service is obtained.

Here, for the LLS signaling, metadata such as SLT (Service List Table) and the like are included. SLT includes information indicative of configurations of a stream and a service in a broadcasting network, such as information (selection information) necessary for the selection of a service.

Further, for the SLS signaling, metadata such as USD (User Service Description), LSID (LCT Session Instance Description), and MPD (Media Presentation Description) are included. USD includes information such as an acquisition source of other metadata. LSID is control information of ROUTE (Real-Time Object Delivery over Unidirectional Transport) protocol. MPD is control information for managing the reproduction of component streams. It should be noted that MPD is based on MPEG-DASH (Dynamic Adaptive Streaming over HTTP) standard.

The clock information processing block 113 processes (generates) clock information and supplies the processed clock information to the signaling processing block 112. Here, for clock information, the clock information specified by PTP (Precision Time Protocol), the clock information specified by NTP (Network Time Protocol) and the like may be used. In what follows, cases in which the clock information specified by PTP is used for clock information will mainly be described. It should be noted that details of the clock information processing block 113 will be described later with reference to FIG. 4.

Further, the signaling processing block 112 generates the signaling of the physical layer (hereafter referred to as L1 signaling) and processes the generated signaling. Here, the signaling processing block 112 can include the clock information (PTP, for example) supplied from the clock information processing block 113 into the L1 signaling as a clock information descriptor. The signaling processing block 112 supplies the L1 signaling to the packet processing block 114.

The packet processing block 114 executes the processing of generating packets by use of the data of video and audio components supplied from the component processing block 111 and the data of the signaling supplied from the signaling processing block 112.

Here, an IP packet including a UDP packet (an IP/UDP packet) is generated and an ALP (ATSC Link-layer Protocol) packet is generated by encapsulating one or more IP/UDP packets. The packets processed by the packet processing block 114 are supplied to the modulation processing block 115.

The modulation processing block 115 generates a physical layer frame and processes the generated physical layer frame by processing the packets supplied from the packet processing block 114. Here, a physical layer frame includes a bootstrap (BS), a preamble, and a payload. For example, the L1 signaling including clock information (a clock information descriptor) can be included in the preamble.

It should be noted that the modulation processing block 115 also executes error correction encoding processing (BCH encoding, LDPC (Low Density Parity Check) encoding and so on, for example) and modulation processing (OFDM (Orthogonal Frequency Division Multiplexing) modulation and so on, for example), for example. The signal processed by the modulation processing block 115 is supplied to the RF block 116.

The RF block 116 converts the signal supplied from the modulation processing block 115 into an RF (Radio Frequency) signal and sends the RF signal via an antenna 121 as a digital broadcast signal based on the IP transmission scheme.

The sending system 10 is configured as described above. It should be noted that, in FIG. 2, the sending system 10 of the sending side includes only one apparatus for the convenience of description; however, the sending system 10 of the sending side may include two or more apparatuses each having the functions of the blocks depicted in FIG. 2.

(Configurational Example of Receiving System)

Figure 3:
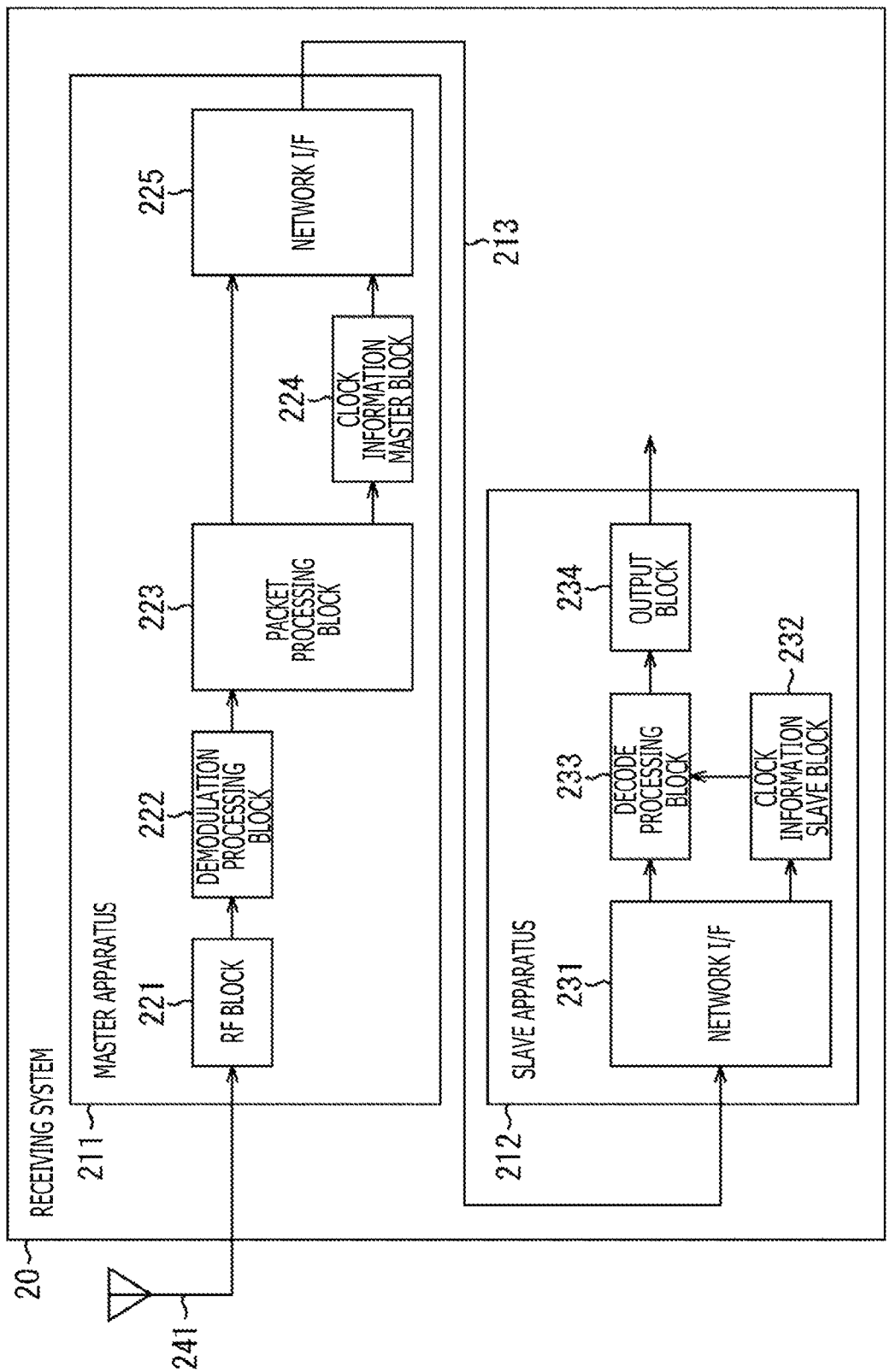
FIG. 3 is a diagram illustrating an example of a configuration of a receiving system.

FIG. 3 depicts an example of a configuration of the receiving system 20 depicted in FIG. 1.

As depicted in FIG. 3, the receiving system 20 has a master apparatus 211 and a slave apparatus 212. Between the master apparatus 211 and the slave apparatus 212, data is transmitted via a network 213.

The master apparatus 211 receives a digital broadcast signal sent from the sending system 10 via the transmission path 30 and processes the content included in a broadcast stream. The master apparatus 211 sends the content obtained from the broadcast stream to the slave apparatus 212 via the network 213. On the other hand, the slave apparatus 212 receives the content sent from the master apparatus 211 via the network 213 and processes (reproduces) the received content.

Here, as the receiving system 20, a CATV redelivery system, an Internet delivery system, a home network system, and the like may be employed, for example.

For example, if a CATV redelivery system is employed as the receiving system 20, a CATV apparatus (a content redelivery apparatus) as the master apparatus 211 and a television receiver as the slave apparatus 212 execute data transmission via a CATV network as the network 213.

Further, for example, if an Internet delivery system is employed as the receiving system 20, a delivery server (a content redelivery apparatus) as the master apparatus 211 and an information device (a smartphone or a tablet terminal apparatus, for example) as the slave apparatus 212 execute data transmission via the Internet as the network 213.

Further, for example, if a home network system is employed as the receiving system 20, a home server or a television receiver as the master apparatus 211 and an information device (a smartphone or a tablet terminal apparatus, for example) as the slave apparatus 212 execute data transmission via a home network such as wireless LAN (Local Area Network) as the network 213.

It should be noted that a CATV redelivery system and an Internet delivery system listed above are merely one example of the receiving system 20; namely, other configurations in which data transmission is executed in a same device may be employed, for example. It should also be noted that details of these other configurations will be described later with reference to FIG. 17.

In addition, in the receiving system 20, the clock information (PTP, for example) of the master apparatus 211 (a clock information master block 224 thereof) is matched with the clock information (PTP, for example) of the slave apparatus 212 (a clock information slave block 232 thereof) by use of the clock information (PTP, for example) included in a digital broadcast signal sent from the sending system 10. Consequently, in the slave apparatus 212, in the reproduction of content, presentation synchronization can be realized, thereby properly executing presentation without involving failed buffering by taking video and audio synchronization, for example.

Here, presentation synchronization denotes the matching between the clock information of the master apparatus 211 (the clock information master block 224 thereof) and the clock information of the slave apparatus 212 (the clock information slave block 232 thereof). If this presentation synchronization is not realized, it is impracticable to implement proper presentation without involving failed buffering by providing synchronization on video and audio in the reproduction of content on the side of the slave apparatus 212.

Further, in order to match the clock information of the master apparatus 211 (the clock information master block 224 thereof) with the clock information of the slave apparatus 212 (the clock information slave block 232 thereof), a transmission delay (a communication delay time) from the master apparatus 211 to the slave apparatus 212 has to be considered, details thereof being described later with reference to FIG. 8 through FIG. 14.

In FIG. 3, the master apparatus 211 has an RF block 221, a demodulation processing block 222, a packet processing block 223, the clock information master block 224, and a network I/F 225.

The RF block 221 receives a digital broadcast signal of IP transmission scheme via an antenna 241 and frequency-converts an RF signal into an IF (Intermediate Frequency) signal, supplying the IF signal to the demodulation processing block 222.

The demodulation processing block 222 processes a physical layer frame by processing the signal supplied from the RF block 221 so as to extract packets. Here, the physical layer frame includes a bootstrap (BS), a preamble, and a payload. For example, the preamble includes L1 signaling including clock information (a clock information descriptor).

It should be noted that the demodulation processing block 222 also executes demodulation processing (OFDM demodulation and so on, for example) and error correction decoding processing (LDPC decoding and BCH decoding, for example). The signal processed by the demodulation processing block 222 is supplied to the packet processing block 223.

The packet processing block 223 processes the packets supplied from the demodulation processing block 222. Here, ALP packet processing is executed and then the IP/UDP packets extracted from this ALP packet are processed, for example. Consequently, an IP/UDP packet (an IP packet) including the data such as video and audio component and signaling is obtained, for example. This IP/UDP packet is supplied to the network I/F 225.

In addition, if an L1 signaling including clock information is extracted (obtained) in the processing of the physical layer frame by the demodulation processing block 222, the packet processing block 223 supplies the clock information to the clock information master block 224.

The clock information master block 224 processes the clock information supplied from the packet processing block 223 and supplies the processed clock information to the network I/F 225. Here, as the clock information, the information of a clock time specified by PTP or the like is used, for example. It should be noted that details of the clock information master block 224 will be described later with reference to FIG. 5 and FIG. 8 through FIG. 14.

To the network I/F 225, the IP/UDP packet (the IP packet) from the packet processing block 223 and the clock information from the clock information master block 224 are supplied. The network I/F 225 sends the data such as the IP/UDP packet and the clock information to the slave apparatus 212 via the network 213 as a transmission path.

The master apparatus 211 is configured as described above.

On the other hand, in FIG. 3, the slave apparatus 212 has a network I/F 231, the clock information slave block 232, a decode processing block 233, and an output block 234.

The network I/F 231 receives the data sent from the master apparatus 211 via the network 213 that is a transmission path. The network I/F 231 processes the IP/UDP packet (the IP packet) including the data such as video and audio component and signaling included in the received data and supplies the processed data to the decode processing block 233. Further, the network I/F 231 supplies the clock information included in the received data to the clock information slave block 232.

The clock information slave block 232 processes the clock information supplied from the network I/F 231 to execute presentation synchronization processing, thereby properly executing presentation without involving failed buffering by providing video and audio (the component data thereof) synchronization by the decode processing executed in the decode processing block 233. In this presentation synchronization processing, the clock information (PTP, for example) of the master apparatus 211 (the clock information master block 224 thereof) is matched with the clock information (PTP, for example) of the slave apparatus 212 (the clock information slave block 232 thereof) by use of the clock information (PTP, for example) included in the digital broadcast signal sent from the sending system 10.

It should be noted that, here, a transmission delay (a communication delay time) from the master apparatus 211 to the slave apparatus 212 is considered, details thereof being described later with reference to FIG. 8 through FIG. 14. Thus, in the receiving system 20, although the clock information transmitted by broadcasting from the sending system 10 is synchronized with a physical layer frame, thereby enabling the correct transmission of the clock information, transmitting this clock information from the master apparatus 211 to the slave apparatus 212 by use of a protocol for transmitting the clock information of PTP or the like assures the correct presentation synchronization processing on the slave apparatus 212. Consequently, also in the case where content redelivery is executed from the master apparatus 211 to the slave apparatus 212 via the network 213, for example, correct clock synchronization can be realized on the slave apparatus 212 by use of clock information.

In accordance with the presentation synchronization processing executed by the clock information slave block 232, the decode processing block 233 decodes the video and audio component data supplied from the network OF 231 and supplies the decoded data to the output block 234.

To the output block 234, the video and audio component data is supplied from the decode processing block 233. The output block 234 displays a video image corresponding to the video component data onto a display block (not depicted) and outputs an audio corresponding to the audio component data from a speaker (not depicted). Consequently, the slave apparatus 212 receives the content sent from the sending system 10 via the transmission path 30 that is the content delivered (redelivered) from the master apparatus 211 via the network 213 and reproduces the received content.

The slave apparatus 212 is configured as described above.

<2. Clock Synchronization Method Using Clock Information Based on Present Technology>

(Overview of PTP Protocol)

Meanwhile, as clock information, the information of a clock time specified by PTP (Precision Time Protocol) can be employed as described above. PTP is specified by IEEE1588 and includes 80 bits.

The 80-bit PTP has a second field (secondsField) of 48 bits indicative of a clock time in unit of second and a nanosecond field (nanosecondsField) of 32 bits indicative of a clock time in unit of nanosecond.

In the second field, "1" is indicative of one second; in the nanosecond field, "1" is indicative of one nanosecond. Therefore, PTP indicative of +2.000000001 seconds includes 0x000000000002 in the second field and 0x00000001 in the nanosecond field, for example. It should be noted that "0x" denotes that the subsequent value is hexadecimal.

Here, since $10^9$ nanoseconds is one second, the nanosecond field takes a value of 0 to less than $10^9$. That is, the maximum value of the nanosecond field is $10^9$-1. Since $10^9$-1 can be expressed by 30 bits, the high-order 2 bits of the 32-bit nanosecond field is always 0.

The IEEE1588 specifies that an epoch which is the origin of a clock time indicated by PTP is 0:00, Jan. 1, 1970 of the international atomic time (TAI). That is, the PTP of the IEEE1588 is indicative of a clock time with 0:00, Jan. 1, 1970 of TAI being an epoch.

Also, if the information of the clock time specified by PTP is employed as the clock information to be included in a physical layer frame, the information of the clock time specified by PTP has enough granularity for the clock information to be included in the physical layer frame and therefore can represent a correct clock time.

From the viewpoint of reproducing a correct clock time by the receiving system 20, the clock information is desired to represent a more correct clock time; if the information of a clock time specified by PTP is employed as the clock information to be included in a physical layer frame, correct clock information can be transmitted so as to reproduce the correct clock time by the receiving system 20. Further, the information of a clock time specified by PTP does not cause a problem of leap seconds.

Meanwhile, according to PTP, extremely correct clock times can be expressed; however, the transmission of clock information having an accuracy more than necessary on the broadcasting by the transmission system 1 depicted in FIG. 1 strains the transmission band, thereby restricting the transmission efficiency. PTP of 80 bits is the clock information of more than necessary in accuracy for the provision of services by broadcasting, so that, even if the amount of information of PTP is reduced to a certain extent, the provision of services by broadcasting can be maintained sufficiently.

Therefore, with the transmission system 1 depicted in FIG. 1, the PTP as clock information can be transmitted by lowering the amount thereof. The lowering of the amount of PTP information can be realized by a method of compressing the PTP, for example. The following describes the processing (clock information processing) associated with the clock information (PTP) executed between the sending system 10 on the sending side and the receiving system 20 on the receiving side in the case where the PTP (the compressed PTP) as clock information is transmitted as being included in the preamble of a physical layer frame.

(Clock Information Processing on Sending Side)

Figure 4:
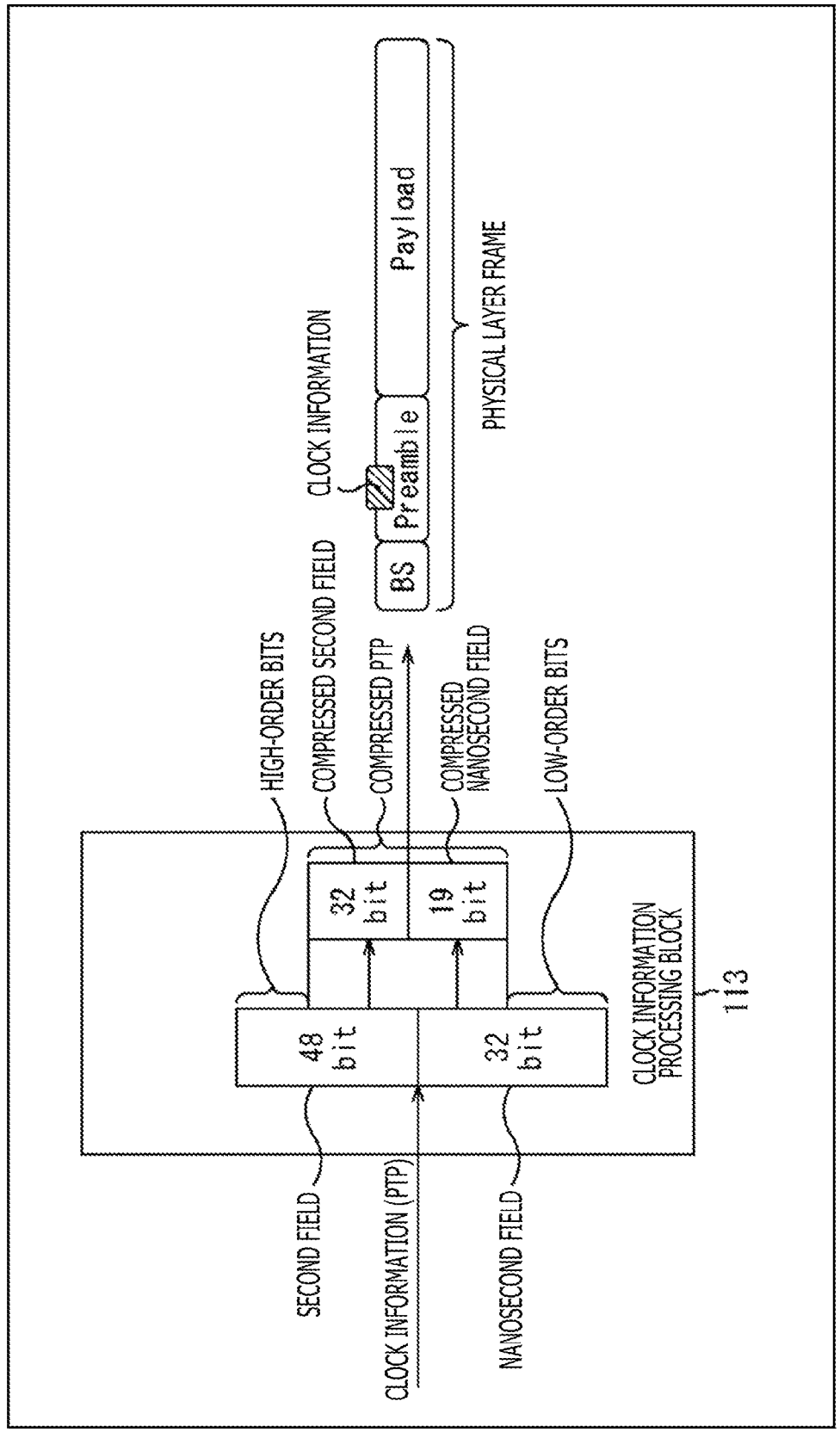
FIG. 4 is a diagram describing clock information processing to be executed in the sending system.

FIG. 4 is a diagram describing the clock information processing to be executed in the sending system 10 on the sending side.

In FIG. 4, an example is depicted in which, as the clock information processing in the sending system 10 (FIG. 1) on the sending side, in compressing the PTP as clock information, the second field is compressed to 32 bits and the nanosecond field is compressed to 19 bits. This compressed PLP is included in the preamble of a physical layer frame as clock information (a clock information descriptor).

In the sending system 10, an 80-bit PTP including a 48-bit second field and a 32-bit nanosecond field is supplied to the clock information processing block 113 (FIG. 2). The clock information processing block 113 deletes the high-order 16 bits, for example, of the 48-bit second field so as to compress the 48-bit second field to a 32-bit second field (hereafter also referred to as a compressed second field).

Further, the clock information processing block 113 deletes the low-order 13 bits, for example, of the 32-bit nanosecond field so as to compress the 32-bit nanosecond field to a 19-bit nanosecond field (hereafter also referred to as a compressed nanosecond field).

Then, the clock information processing block 113 includes a 51-bit PTP (hereafter also referred to as a compressed PTP) compressed to the 32-bit compressed second field and the 19-bit compressed nanosecond field into a clock information descriptor so as to supply the PTP to the signaling processing block 112 (FIG. 2).

As described above, in the PTP compressing method, partial bits of the second field and the nanosecond field of a PTP are deleted so as to transmit the PTP as compressed to a compressed PTP (compressed clock information) of an intermediate format, so to speak.

Further, in the sending system 10, in the processing of a physical layer frame, the modulation processing block 115 (FIG. 2) can include the compressed PTP processed by the clock information processing block 113 into the preamble as clock information. However, clock information (compressed PTP) can be included in L1 signaling as a clock information descriptor so as to be arranged in the preamble.

It should be noted that clock information (compressed PTP) may be included in the payload of a physical layer frame rather than the preamble. Further, clock information (compressed PTP) may not be included in all physical layer frames, thereby lowering the frequency of transmitting clock information (compressed PTP).

(Clock Information Processing on Receiving Side)

Figure 5:
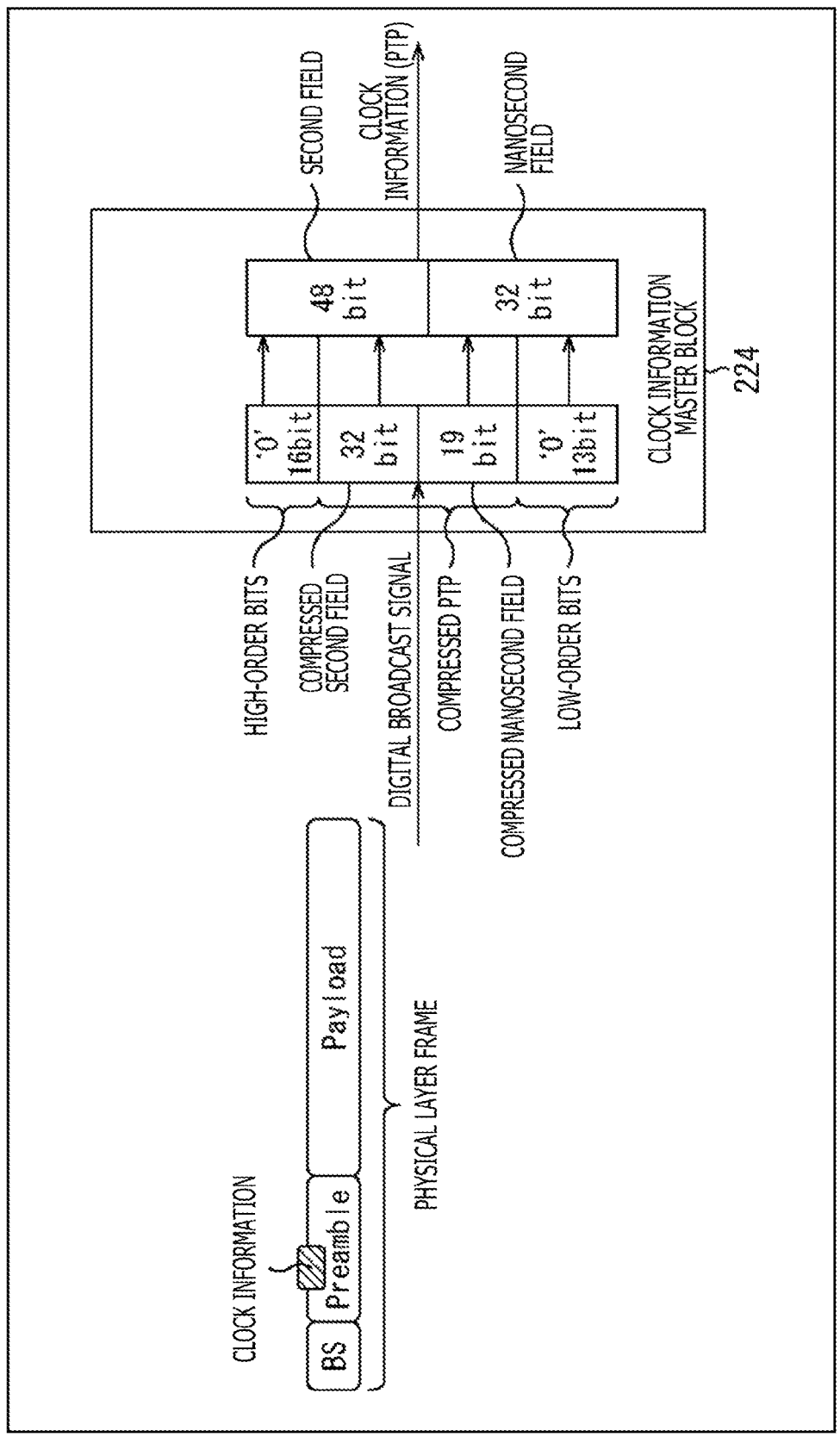
FIG. 5 is a diagram describing clock information processing to be executed in the receiving system.

FIG. 5 is a diagram describing the clock information processing to be executed in the receiving system 20 on the receiving side.

In FIG. 5, an example is depicted in which, as the clock information processing in the receiving system 20 (FIG. 1) on the receiving side, a compressed PTP included in the preamble of a physical layer frame is obtained and this compressed PTP is restored to PTP of a format specified in the IEEE1588.

In the receiving system 20, in processing a physical layer frame, if clock information (compressed PTP) is included in the preamble of this physical layer frame, the demodulation processing block 222 (FIG. 3) can obtain the clock information (the compressed PTP). However, the clock information (the compressed PTP) is included in L1 signaling as a clock information descriptor.

Then, in the receiving system 20, the clock information master block 224 (FIG. 3) obtains the compressed PTP included in the clock information descriptor and restores the obtained compressed PTP to the PTP of a format specified in the IEEE1588.

That is, the clock information master block 224 restores a 32-bit compressed second field to a 48-bit second field by attaching (adding) 16-bit "0s" as the high-order bits of the 32-bit compressed second field of the compressed PTP.

Further, the clock information master block 224 restores a 19-bit compressed nanosecond field to a 32-bit nanosecond field by attaching 13-bit "0s" as the low-order bits of the 19-bit compressed nanosecond field of the compressed PTP.

Next, the clock information master block 224 restores the PTP of a format specified in the IEEE1588 that includes a 48-bit second field and a 32-bit nanosecond field.

It should be noted that, in the clock information processing block 113 (FIG. 4) of the sending system 10, the low-order 13 bits of the 32-bit nanosecond field are deleted and, as described above, the high-order 2 bits that are always "0s" are deleted, thereby enabling to compress the 32-bit nanosecond field to a 17-bit compressed nanosecond field.

In this case, in the clock information master block 224 (FIG. 5) of the receiving system 20, 13-bit "0s" are attached as the low-order bits of the 17-bit compressed nanosecond field and 2-bit "0s" are attached as the high-order bits, thereby restoring the 17-bit compressed nanosecond field to the 32-bit nanosecond field.

If not a standard epoch but a unique epoch is employed for the PTP epoch, the clock information processing block 113 (FIG. 4) of the sending system 10 subtracts a time (hereafter referred to as a difference time) corresponding to a difference between a standard epoch and a unique epoch (unique epoch—standard epoch) from the PTP and then compresses the PTP after subtraction to a compressed PTP.

In this case, the clock information master block 224 (FIG. 5) of the receiving system 20 restores the compressed second field and the compressed nanosecond field to a second field and a nanosecond field and then adds the different time to the restored second field and the restored nanosecond field, thereby restoring the PTP (the PTP of the standard epoch) of a format specified in the IEEE1588.

(Structure of Clock Information)

FIG. 6 is a diagram illustrating an example of a syntax of clock information (a clock information descriptor) included in L1 signaling (L1 Detail signaling).

In the L1 signaling depicted in FIG. 6, if a flag (L1B clock info flag) indicative of the presence or absence of clock information is set up, clock information (a clock information descriptor) is arranged.

This clock information (the clock information descriptor) includes a compressed PTP including a 32-bit second field (PTP_sec) and a 17-bit compressed nanosecond field (PTP_nanosec).

In this example, however, an example is presented in which a 17-bit compressed nanosecond field (PTP_nanosec) is arranged; however, a 19-bit compressed nanosecond field may be arranged instead of a 17-bit compressed nanosecond field.

An 8-bit PTP_UTC_offset is the information of offset between PTC and UTC (Coordinated Universal Time). With PTP_UTC_offset, a time difference between PTP and UTC can be specified in units of seconds.

Use of this PTP_UTC_offset allows conversion of PTP into UTC. It should be noted that FIG. 7 depicts an example of the conversion from PTP to UTC. That is, the computation of the equation (1) below allows the conversion of the second in PTP format into the second of NTP format.

$$UTC\_seconds = PTP\_sec + PTP\_UTC\_offset \quad (1)$$

UTC_seconds: seconds in NTP format
PTP_sec: seconds in PTP format
PTP_UTC_offset: difference between PTP and UTC The computation of the equation (2) below allows the conversion of the nanosecond of PTP format into the subsecond of NTP format.

$$UTC\_fraction = PTP\ nanosec \quad (2)$$

UTC_fraction: subseconds in NTP format
PTP_nanosec: nanoseconds in PTP format (Method of Correcting PTP Clock Information)

Figure 8:
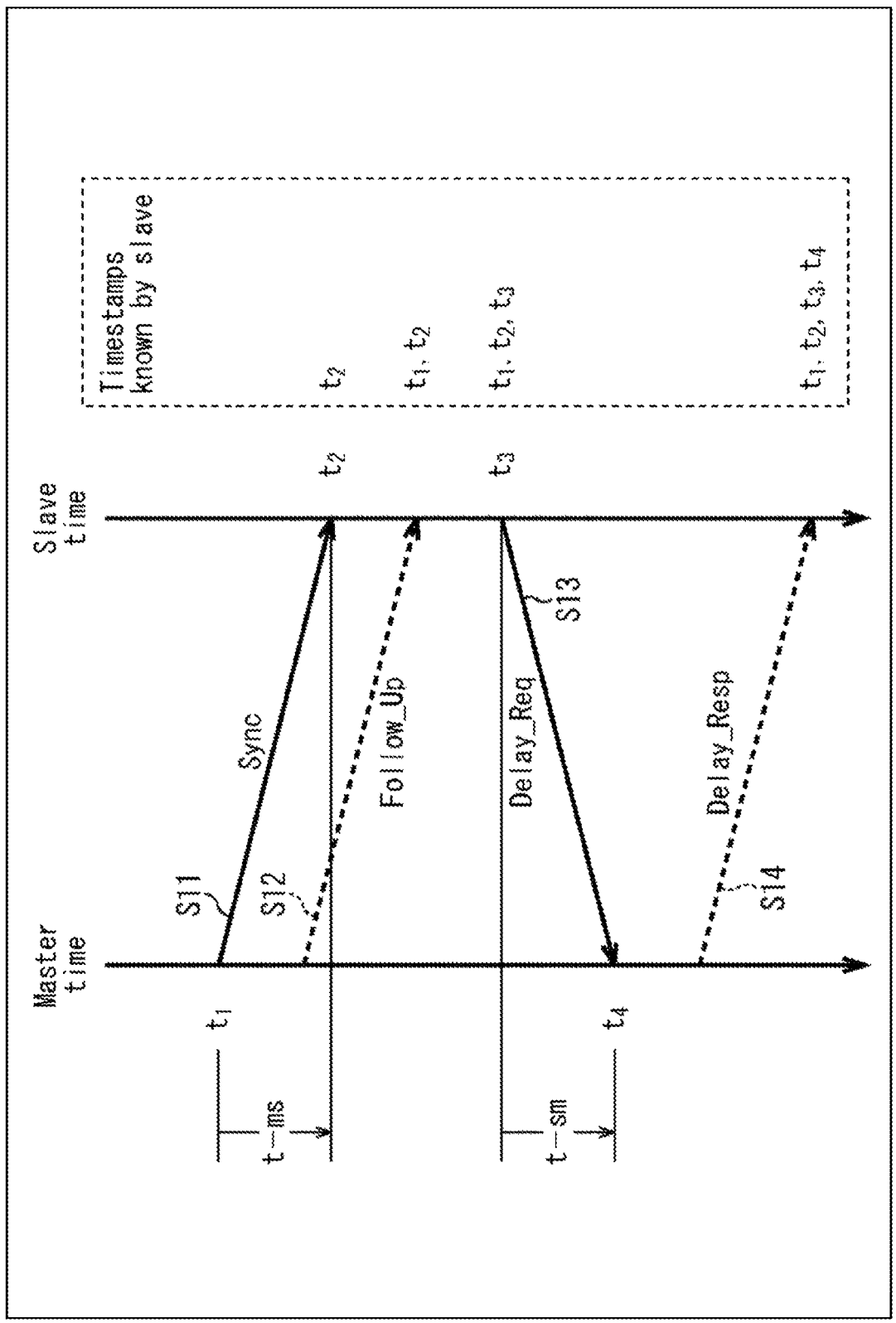
FIG. 8 is a diagram describing a correction method of clock information by a PTP protocol.

FIG. 8 is a diagram describing a method of correcting the clock information by a PTP protocol.

As depicted in FIG. 8, "Master time" is a line of clock information to be processed by the master apparatus 211 (the clock information master block 224 thereof) and "Slave time" is a line of clock information to be processed by the slave apparatus 212 (the clock information slave block 232 thereof).

The clock information master block 224 of the master apparatus 211 sends a Sync message to the clock information slave block 232 of the slave apparatus 212 (S11). With this Sync message, the slave apparatus 212 is notified of clock information from the master apparatus 211.

At this moment, the clock information master block 224 of the master apparatus 211 records a send time t1 of the Sync message. On the other hand, the clock information slave block 232 of the slave apparatus 212 records a receive time t2 of the Sync message.

Further, the clock information master block 224 of the master apparatus 211 sends a Follow_up message to the clock information slave block 232 of the slave apparatus 212 (S12). With this Follow_up message, the slave apparatus 212 is notified of the send time t1 of the Sync message from the master apparatus 211. Consequently, the send time t1 of the Sync message is recorded to the clock information slave block 232 of the slave apparatus 212 along with the receive time t2 of this Sync message.

The clock information slave block 232 of the slave apparatus 212 sends a Delay_Req message to the clock information master block 224 of the master apparatus 211 (S13).

At this moment, the clock information slave block 232 of the slave apparatus 212 records a send time t3 of the Delay_Req message. On the other hand, the clock information master block 224 of the master apparatus 211 records a receive time t4 of the Delay_Req message.

Further, the clock information master block 224 of the master apparatus 211 sends the Delay_Resp message to the clock information slave block 232 of the slave apparatus 212 (S14). With this Delay_Resp message, the slave apparatus 212 is notified of the receive time t4 of the Delay_Req message from the master apparatus 211. Consequently, the receive time t4 of this Delay_Req message is recorded to the clock information slave block 232 of the slave apparatus 212 along with the send time t3 of the Delay_Req message.

Then, on the basis of the send time and receive time of the recorded message, the clock information slave block 232 of the slave apparatus 212 computes a communication delay time between the master apparatus 211 and the slave apparatus 212. However, this communication delay time (meanPathDelay) is computed by the equation (3) below.

$$meanPathDelay = \{(t2-t1)+(t4-t3)\} \quad (3)$$

t1: send time of Sync message
t2: receive time of Sync message
t3: send time of Delay_Req message
t4: receive time of Delay_Req message As described above, correcting the clock information sent in a Sync message by use of a communication delay time (meanPathDelay) computed by the equation (1) (adding a communication delay time to a clock time indicated by clock information, for example) allows the clock information slave block 232 of the slave apparatus 212 to obtain a correct clock time based on the clock information sent in a Sync message.

It should be noted that, in the example depicted in FIG. 8, a communication delay time is measured by the clock information slave block 232 of the slave apparatus 212 on the assumption that a communication delay time be variable; however, if a communication delay time between the master apparatus 211 and the slave apparatus 212 is fixed, this communication delay time need not be measured, so that a predetermined fixed value (a communication delay time thereof) may be added to a clock information (a clock time indicated thereby) transmitted in a Sync message.

(Example of Fields of General Header)

FIG. 9 depicts an example of the fields included in the General header of a PTP message.

A PTP message includes a 34-byte General header and a 10-byte message field. The General header includes the fields depicted in FIG. 9.

A 4-bit transportSpecific specifies a value that is uniquely determined depending upon hardware.

A 4-bit messageType specifies a value that is uniquely determined in accordance with a message type. FIG. 10 depicts an example of message types. That is, as depicted in FIG. 10, messageType specifies a value corresponding to a message type such as "Sync," "Delay_Req," "Follow_up," or "Delay_Resp."

Back to FIG. 9, a 4-bit versionPTP specifies a value of portDS.versionNumber member of a dataset of a message generation node. A 16-bit messageLength specifies the number of all bits of the PTP message.

An 8-bit domainNumber specifies a value of defaultDS.domainNumber member of a dataset of an ordinary clock node or a boundary clock node that generates a message.

A 16-bit flagField provides a flag that has a meaning for each message in each of the bits in 2 bytes (16 bits). For example, in a flagField, 1 bit of byte 1 may be made indicative of a Sync message or a Delay_Resp message.

A 64-bit correctionField specifies a corrected value of a detention time or a transmission delay, for example. An 80-bit sourcePortIdentity specifies a value of portDS.PortIdentity member of a dataset of a message generation node.

A 16-bit sequenceID specifies a value for managing a message set for exchanging time stamps. An 8-bit controlField is a field prepared for the compatibility with the hardware for PTP version 1. An 8-bit logMessageInterval specifies a value that is determined by message type.

(Example of Sync Message Format)

FIG. 11 is a diagram illustrating an example of a format of a Sync message.

In FIG. 11, a Sync message includes a 34-byte General header (FIG. 9) and a 10-byte Sync message field. Here, the messageType of the General header specifies a value (value="0") in accordance with the message type that is "Sync." In the field of the Sync message, clock information (originTimestamp) is arranged.

(Example of Delay_Req Message Format)

FIG. 12 is a diagram illustrating an example of a format of a Delay_Req message.

In FIG. 12, a Delay_Req message includes a 34-byte General header (FIG. 9) and a 10-byte Delay_Req message field. Here, the messageType of the General header specifies a value (value="1") in accordance with the message type that is "Delay_Req." In the field of a Delay_Req message, the clock information (originTimestamp) of a node of sending the Delay_Req message.

(Example of Follow_Up Message Format)

FIG. 13 is a diagram illustrating an example of a format of a Follow_up message.

In FIG. 13, a Follow up message includes a 34-byte General header (FIG. 9) and a 10-byte Follow-up message field. Here, the messageType of the General header specifies a value (value="8") in accordance with the message type that is "Follow_up." In the field of the Follow-up message, clock information (preciseOriginTimestamp) indicative of a clock time of sending a Sync message, namely, send time t1 of a Sync message, is arranged.

(Example of Delay_Resp Message Format)

FIG. 14 is a diagram illustrating an example of a format of a Delay_Resp message.

In FIG. 14, a Delay_Resp message includes a 34-byte General header (FIG. 9) and a 20-byte Delay_Resp message field. Here, the messageType of the General header specifies a value (value="9") in accordance with the message type that is "Delay_Resp."

Further, in the field of a Delay_Resp message, 10-bit clock information (receiveTimestamp) and a 10-bit requestingPortIdentity are arranged. The clock information (receiveTimestamp) is indicative of a clock time of receiving the Delay_Req message, namely, the receive time t4 of the Delay_Req message. In addition, to requestingPortIdentity, the value of sourcePortIdentity of the Delay_Req message is copied.

<3. Flow of Processing Executed on Sending Side and Receiving Side>

Figure 15:
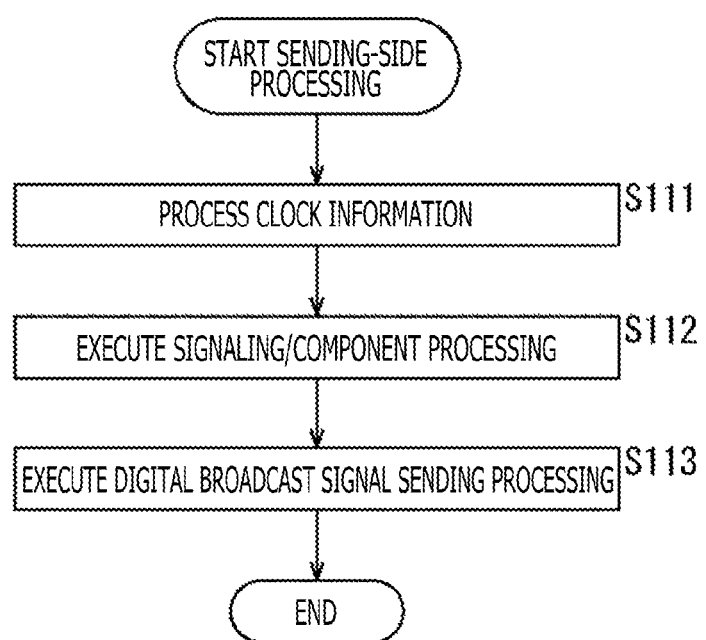
FIG. 15 is a flowchart describing a flow of sending-side processing.
Figure 16:
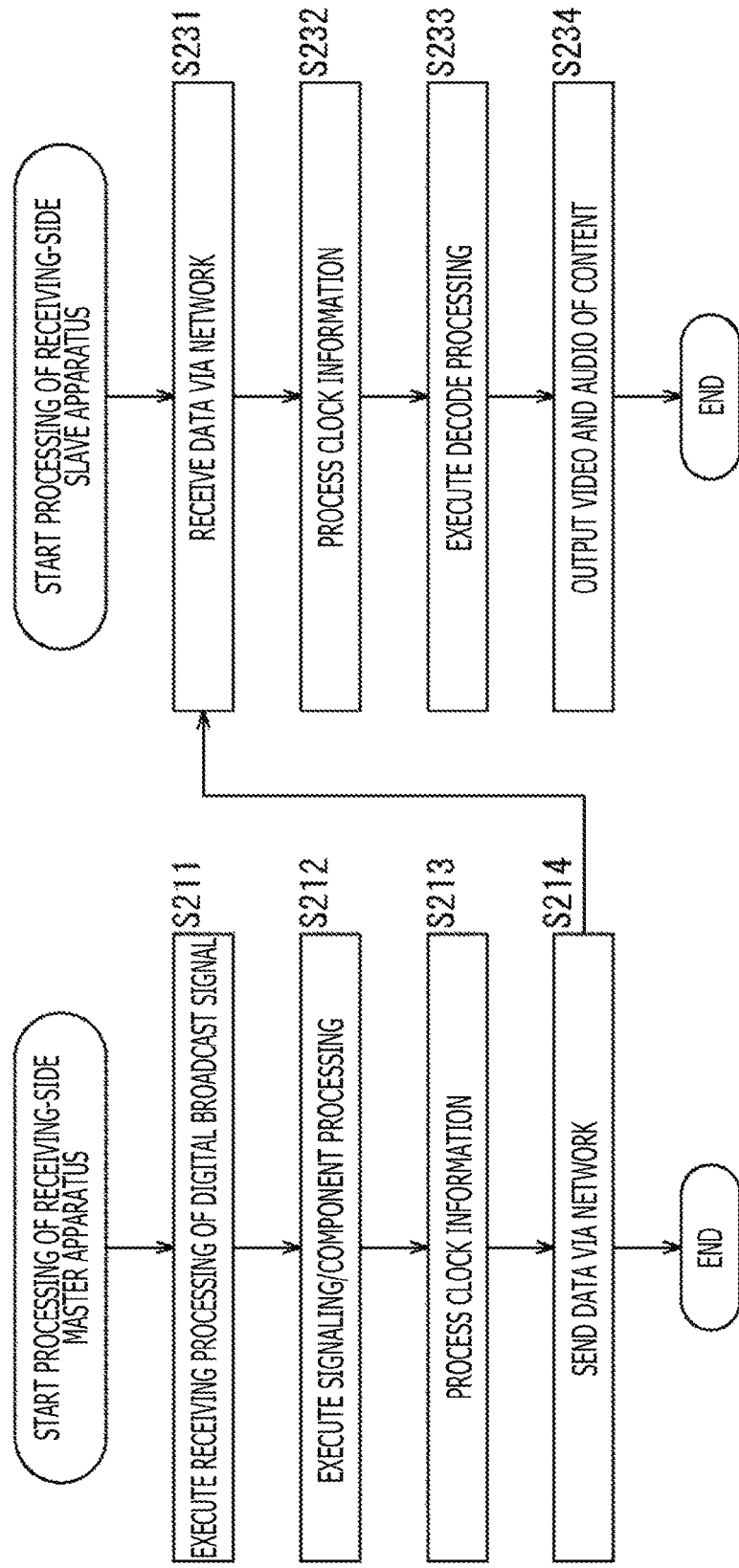
FIG. 16 is a flowchart describing a flow of receiving-side processing.

The following describes a flow of processing to be executed by the sending system 10 on the sending side and the receiving system 20 on the receiving side with reference to the flowcharts depicted in FIG. 15 and FIG. 16.

(Processing on Sending Side)

First, with reference to the flowchart depicted in FIG. 15, a flow of the processing on the sending side that is executed by the sending system 10 on the sending side is described.

In step S111, the clock information processing block 113 processes clock information such as PTP and so on.

Here, as depicted in FIG. 4, for example, an 80-bit PTP including a 48-bit second field and a 32-bit nanosecond field is compressed to a 51-bit compressed PTP including a 32-bit compressed second field and a 19-bit compressed nanosecond field.

In step S112, the component processing block 111 and the signaling processing block 112 execute signaling/component processing.

In this signaling/component processing, the video and audio components making up content and signaling such as LLS signaling and SLS signaling are processed. In addition, in the signaling/component processing, the clock information (a compressed PTP, for example) processed by the clock information processing block 113 is included in L1 signaling as a clock information descriptor.

In step S113, the packet processing block 114, the modulation processing block 115, and the RF block 116 execute the sending processing of a digital broadcast signal.

In this sending processing of a digital broadcast signal, the processing of generating packets such as IP/UDP packets and so on by use of the data of video and audio components and the data of signaling is executed. Further, in the sending processing of a digital broadcast signal, the processing of generating a physical layer frame is executed. However, the preamble of the physical layer frame (FIG. 4) includes L1 signaling that includes clock information (a compressed PTP, for example).

Then, in the sending processing of a digital broadcast signal, a signal obtained by processing a physical layer frame is converted into an RF signal, which is sent as a digital broadcast signal of IP transmission scheme via the antenna 121.

A flow of the processing on the sending side is as described above.

(Processing on Receiving Side)

The following describes a flow of the processing on the receiving side to be executed by the receiving system 20 on the receiving side with reference to the flowchart of FIG. 16. It should be noted that the processing operations in steps S211 through S214 depicted in FIG. 16 are executed by the master apparatus 211 and the processing operations in steps S231 through S234 are executed by the slave apparatus 212.

In step S211, the RF block 221, the demodulation processing block 222, and the packet processing block 223 of the master apparatus 211 execute the receiving processing of a digital broadcast signal. In this receiving processing of a digital broadcast signal, a digital broadcast signal of IP transmission scheme is received via the antenna 241 and an RF signal thereof is frequency-converted into an IF signal.

Further, in the receiving processing of a digital broadcast signal, a physical layer frame is processed so as to extract packets. It should be noted that the preamble of a physical layer frame (FIG. 5) includes L1 signaling that includes clock information (a compressed PTP, for example) from which the clock information is obtained. Further, in the receiving processing of a digital broadcast signal, packets extracted from the physical layer frame are processed.

In step S212, the packet processing block 223 of the master apparatus 211 executes signaling/component processing. In this signaling/component processing, IP/UDP packets (IP packets) including the data of video and audio component and signaling are processed, for example.

In step S213, the clock information master block 224 of the master apparatus 211 processes clock information such as a compressed PTP and so on.

Here, for example, as depicted in FIG. 5, a 51-bit compressed PTP including a 32-bit compressed second field and a 19-bit compressed nanosecond field is restored to the 80-bit PTP including the 48-bit second field and the 32-bit nanosecond field.

In step S214, the network I/F 225 sends the data such as the IP/UDP packets and clock information (a PTP) to the slave apparatus 212 via the network 213.

When the processing operations in steps S211 through S214 have been executed by the master apparatus 211, then the slave apparatus 212 accordingly executes the processing operations in step S231 through S234. That is, in step S231, the network OF 231 receives the data sent from the master apparatus 211 via the network 213.

In step S232, the clock information slave block 232 processes the clock information (PTP) included in the data sent from the master apparatus 211 so as to execute presentation synchronization processing and provides synchronization on the video and audio (the data of the components thereof) by the decode processing executed in the decode processing block 233, thereby providing proper presentation without failing buffering.

In this presentation synchronization processing, the clock information (PTP, for example) of the master apparatus 211 (the clock information master block 224 thereof) is matched with the clock information (PTP, for example) of the slave apparatus 212 (the clock information slave block 232 thereof) by use of the clock information (PTP, for example) included in a digital broadcast signal sent from the sending system 10. Further, as described above with reference to FIG. 8 through FIG. 14, the clock information master block 224 of the master apparatus 211 and the clock information slave block 232 of the slave apparatus 212 exchange messages so as to correct the clock information of PTP in accordance with transmission delay (communication delay time).

That is, in the receiving system 20, the clock information to be transmitted by broadcasting from the sending system 10 is synchronized with a physical layer frame for correct transmission; however, in order to correctly execute presentation synchronization processing in the slave apparatus 212, this clock information is transmitted from the master apparatus 211 to the slave apparatus 212 by use of a protocol for transmitting clock information such as PTP or the like. Consequently, also in the case where content is redelivered from the master apparatus 211 to the slave apparatus 212 via the network 213, for example, the correct clock synchronization can be executed by use of the clock information in the slave apparatus 212.

It should be noted that, although it is a general practice to reference a NTP (Network Time Protocol) server arranged on the Internet so as to obtain correct clock information, a digital broadcast signal transmitted via the transmission path 30 involves an error between the clock information of content and the clock information from the NTP server on the Internet due to a transmission delay (Propagation Delay) from the sending system 10 (the sending station). Therefore, the present technology avoids this problem by using not the clock information from the NTP server but the clock information included in the physical layer frame transmitted from the sending system 10.

In step S233, the decode processing block 233 executes decode processing on the data of video and audio components included in the data sent from the master apparatus 211 in accordance with the presentation synchronization processing by the clock information slave block 232.

In step S234, the output block 234 displays a video image corresponding to the data of the video component decoded by the decode processing block 233 onto a display block (not depicted). In addition, the output block 234 outputs the audio corresponding to the data of the audio component decoded by the decode processing block 233 to a speaker (not depicted).

Consequently, the slave apparatus 212 receives the content sent from the sending system 10 via the transmission path 30 that is delivered (redelivered) from the master apparatus 211 via the network 213 and reproduces the received content.

The flow of the processing on the receiving side is executed as described above.

<4. Variations>

(Configuration Examples of Receiving System on Receiving Side)

Figure 17:
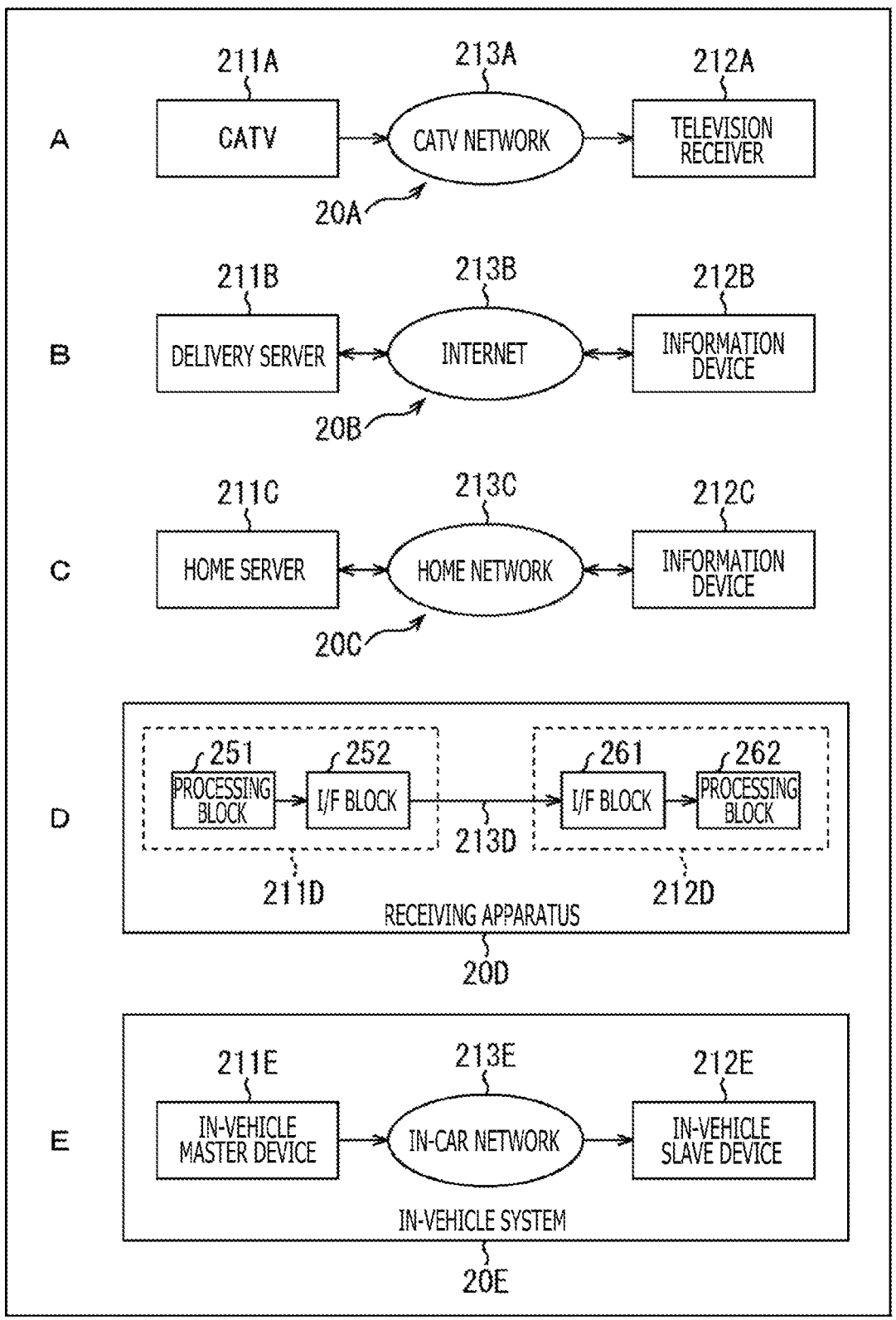
FIG. 17 is a diagram illustrating examples of configurations of a master apparatus and a slave apparatus in the receiving system.

FIG. 17 is a diagram illustrating examples of the configurations of master apparatuses 211 and slave apparatuses 212 in the receiving system 20. It should be noted that, in FIG. 17, FIG. 17A through FIG. 17E depict the configurational examples of a CATV redelivery system 20A, an Internet delivery system 20B, a home network system 20C, a receiving apparatus 20D, and an in-vehicle system 20E, respectively, as examples of the receiving system 20.

(A) CATV Redelivery System

FIG. 17A depicts an exemplary configuration of the CATV redelivery system 20A. In this CATV redelivery system 20A, a CATV apparatus 211A as the master apparatus 211 and a television receiver 212A as the slave apparatus 212 execute data transmission with each other via a CATV network 213A.

Here, the CATV apparatus 211A is a redelivery apparatus for redelivering, using cable television, the content broadcast by terrestrial broadcasting and so on by the sending system 10. The CATV apparatus 211A is provided by a cable television business, for example. On the other hand, the television receiver 212A is a television receiver corresponding to the cable television installed in each home. The television receiver 212A can receive content redelivered from the CATV apparatus 211A via the CATV network 213A and reproduce the received content.

Further, in the CATV redelivery system 20A, the clock information (PTP, for example) of the CATV apparatus 211A (the clock information master block 224 thereof) is matched with the clock information (PTP, for example) of the television receiver 212A (the clock information slave block 232 thereof) by use of the clock information (PTP, for example) included in the digital broadcast signal from the sending system 10. Consequently, in the television receiver 212A, presentation synchronization can be realized at the time of reproducing content, thereby executing proper presentation without failing buffering by executing synchronization on video and audio, for example.

(B) Internet Delivery system

FIG. 17B depicts an exemplary configuration of the Internet delivery system 20B. In this Internet delivery system 20B, a delivery server 211B as the master apparatus 211 and an information device 212B as the slave apparatus 212 execute data transmission with each other via the Internet 213B.

Here, the delivery server 211B is a server apparatus for delivering the content broadcast by terrestrial broadcasting and so on by the sending system 10 via the Internet 213B. The delivery server 211B is provided by a business of OTT (Over The Top) that executes moving image delivery services, for example. On the other hand, the information device 212B is a device (a client apparatus) having communication functions of mobile phones, smartphones, tablet terminal apparatuses, personal computers, and television receivers, for example. The information device 212B can receive content delivered from the delivery server 211B via the Internet 213B so as to reproduce the received content.

In addition, in the Internet delivery system 20B, the clock information (PTP, for example) of the delivery server 211B (the clock information master block 224 thereof) is matched with the clock information (PTP, for example) of the information device 212B (the clock information slave block 232 thereof) by use of the clock information (PTP, for example) included in a digital broadcast signal from the sending system 10. Consequently, in the information device 212B, presentation synchronization can be realized at the time of reproducing content, thereby properly executing presentation without failing buffering by providing synchronization on video and audio, for example.

(C) Home Network System

FIG. 17C depicts an exemplary configuration of the home network system 20C. In this home network system 20C, a home server 211C as the master apparatus 211 and an information device 212C as the slave apparatus 212 execute data transmission with each other via the home network 213C such as wireless LAN (Local Area Network).

Here, the home server 211C is a server apparatus for delivering the content broadcast in terrestrial broadcasting or the like by the sending system 10 via the home network 213C. The home server 211C has a function of receiving digital broadcasting and is installed in each home and so on. On the other hand, the information device 212C is a device (a client apparatus) having communication functions of mobile phones, smartphones, tablet terminal apparatuses, personal computers, and television receivers, for example, and used in homes. The information device 212C can receive content delivered from the home server 211C via the home network 213C so as to reproduce the received content.

Further, in the home network system 20C, the clock information (PTP, for example) of the home server 211C (the clock information master block 224 thereof) is matched with the clock information (PTP, for example) of the information device 212C (the clock information slave block 232 thereof) by use of the clock information (PTP, for example) included in a digital broadcast signal from the sending system 10. Consequently, in the information device 212C, presentation synchronization can be realized at the time of reproducing content, thereby executing proper presentation without failing buffering by providing synchronization on video and audio, for example.

It should be noted that, in the home network system 20C depicted in FIG. 17C, a television receiver can be arranged as the master apparatus 211 instead of the home server 211C so as to use, as a so-called second display, a smartphone or a tablet terminal apparatus as the information device 212C.

(D) In the Same Device

FIG. 17D depicts an exemplary configuration of the receiving apparatus 20D. In this receiving apparatus 20D, an in-receiver master device 211D as the master apparatus 211 and an in-receiver slave device 212D as the slave apparatus 212 execute data transmission with each other via a general-purpose transmission interface 213D such as USB3.0 (Universal Serial Bus 3.0) or PCIe (PCI Express), for example.

Here, the in-receiver master device 211D is a device for transmitting content broadcast in terrestrial broadcasting or the like to the in-receiver slave device 212D by the sending system 10 via the transmission interface 213D. The in-receiver master device 211D includes a processing block 251 and an OF block 252. On the other hand, the in-receiver slave device 212D is a device for processing the content transmitted from the in-receiver master device 211D via the transmission interface 213D. The in-receiver slave device 212D includes an I/F block 261 and a processing block 262.

Further, in the receiving apparatus 20D, the clock information (PTP, for example) of the in-receiver master device 211D (the clock information master block 224 thereof) is matched with the clock information (PTP, for example) of the in-receiver slave device 212D (the clock information slave block 232 thereof) by use of the clock information (PTP, for example) included in a digital broadcast signal from the sending system 10. Consequently, in the in-receiver slave device 212D, presentation synchronization can be realized at the time of processing content, thereby properly executing presentation without failing buffering by providing synchronization on video and audio, for example.

(E) In-Vehicle System

FIG. 17E depicts an exemplary configuration of the in-vehicle system 20E that is installed on a vehicle. In this in-vehicle system 20E, an in-vehicle master device 211E as the master apparatus 211 and an in-vehicle slave device 212E as the slave apparatus 212 execute data transmission with each other via an in-car network 213E.

Here, the in-vehicle master device 211E is a device for transmitting, by the sending system 10, the content broadcast in a terrestrial broadcasting or the like to the in-vehicle slave device 212E via the in-car network 213E. On the other hand, the in-vehicle slave device 212E is a device for processing the content transmitted from the in-vehicle master device 211E via the in-car network 213E.

Further, in the in-vehicle system 20E, the clock information (PTP, for example) of the in-vehicle master device 211E (the clock information master block 224 thereof) is matched with the clock information (PTP, for example) of the in-vehicle slave device 212E (the clock information slave block 232 thereof) by use of the clock information (PTP, for example) included in a digital broadcast signal from the sending system 10. Consequently, in the in-vehicle slave device 212E, presentation synchronization can be realized at the time of processing content, thereby properly providing presentation without failing buffering by providing synchronization on video and audio, for example.

(Other Clock Information Examples)

In the description done above, the clock information is described by focusing the information of a clock time specified in PTP and handling the information of a clock time specified in NTP as optional; however, it is also practicable to employ the information of a clock time specified in 3GPP (Third Generation Partnership Project), the information of a clock time specified in GPS (Global Positioning System), or the information of a clock time specified in other uniquely determined formats.

(Digital Broadcasting Schemes)

In the description done above, the digital broadcasting standard is ATSC (especially, ATSC3.0) employed in the United States and other countries; however, it is also practicable for the present technology to be applied to ISDB (Integrated Services Digital Broadcasting) employed by Japan or DVB (Digital Video Broadcasting) employed by European countries. In addition, for digital broadcasting, the present technology is applicable to satellite broadcasting such as BS (Broadcasting Satellite) and CS (Communication Satellite) and wired broadcasting such as cable television (CATV) in addition to terrestrial broadcasting.

Further, the present technology is also applicable to a predetermined standard (a standard other than digital broadcasting standards) specified by assuming the use, as the transmission path 20 (FIG. 1), of transmission paths other than broadcasting networks, namely, communication lines (communication networks) such as the Internet and telephone networks. In this application, a communication line such as the Internet or a telephone network can be used for the transmission path 30 (FIG. 1) and the sending system 10 may be a server apparatus installed on the Internet. Then, providing the receiving system 20 (the master apparatus 211 thereof) with communication functions allows the sending system 10 to execute processing in response to requests from the receiving system 20 (the master apparatus 211 thereof). Further, the content to be sent from the sending system 10 may include all types of content such as electronic books and advertisements, for example, in addition to moving images and music.

<5. Configuration of Computer>

A sequence of processing operations described above is executable by hardware as well as software. In executing the sequence of processing operations by software, the programs making up this software are installed on a computer. FIG. 18 depicts an example of a configuration of the hardware of a computer that executes the above-mentioned sequence of processing operations by programs.

In a computer 900, a CPU (Central Processing Unit) 901, a ROM (Read Only Memory) 902, a RAM (Random Access Memory) 903 are interconnected via a bus 904. The bus 904 is further connected with an input/output interface 905. The input/output interface 905 is connected with an input block 906, an output block 907, a recording block 908, a communication block 909, and a drive 910.

The input block 906 has a keyboard, mouse, microphone, and so on. The output block 907 has a display, speaker, and so on. The recording block 908 has a hard disc drive, a nonvolatile memory, and so on. The communication block 909 has a network interface and so on. The drive 910 drives a removable medium 911 such as a magnetic disc, an optical disc, a magneto-optical disc, or a semiconductor memory.

In the computer 900 configured as described above, the CPU 901 loads programs recorded to the ROM 902 or the recording block 908 into the RAM 903 via the input/output interface 905 and the bus 904, thereby executing the sequence of processing operations described above.

Programs to be executed by the computer 900 (the CPU 901) can be provided as recorded to the removable medium 911 such as a package medium, for example. In addition, programs can also be provided through wired or wireless transmission media such as a local area network, the Internet, or digital satellite broadcasting.

In the computer 900, programs can be installed into the recording block 908 via the input/output interface 905 by mounting the removable medium 911 on the drive 910. It is also practicable to receive programs by the communication block 909 via a wired or wireless transmission medium and install the received programs into the recording block 908. In other cases, programs can be installed in advance in the ROM 902 or the recording block 908.

It should be noted that, in the present description, the processing to be executed by a computer as instructed by programs need not always be executed in a time sequence described as a flowchart. That is, the processing to be executed by a computer in accordance with programs includes parallel processing or discrete processing (for example, parallel processing or processing based on objects). Also, programs may be processed by one unit of a computer (a processor) or processed by two or more computers in a distributed manner.

It should be noted that the embodiments of the present technology are not restricted to those described above and therefore may be changed in a variety of manners within the scope of the gist of the present technology.

The present technology can also take the following configuration.

(1)

A data processing apparatus including:

a receiving block configured to receive a digital broadcast signal;

a processing block configured to process content included in the digital broadcast signal and clock information included therein for use in presentation synchronization on the content; and a sending block configured to send the clock information along with the content to another data processing apparatus that presents the content via a transmission path.

(2)

The data processing apparatus according to (1) above, in which a clock information descriptor including the clock information is included in a preamble of a physical layer frame included in the digital broadcast signal.

(3)

The data processing apparatus according to (2) above, in which the clock information descriptor includes compressed clock information obtained by compressing the clock information.

(4)

The data processing apparatus according to (2) or (3) above, in which the clock information is one of information of a clock time specified by PTP (Precision Time Protocol) and information of a clock time specified by NTP (Network Time Protocol).

(5)

The data processing apparatus according to (4) above, in which the clock information is information of a clock time specified by the PTP, and the processing block transfers a message with another processing block that processes the clock information in the another data processing apparatus, thereby correcting the clock information processed by the another processing block in accordance with a transmission delay.

(6)

The data processing apparatus according to any one of (1) through (5) above, in which the transmission path is a broadcasting transmission path, the data processing apparatus is a redelivery apparatus configured to redeliver the content, and the another data processing apparatus is a reproducing apparatus configured to reproduce the content redelivered from the redelivery apparatus via broadcasting.

(7)

The data processing apparatus according to any one of (1) through (5) above, in which the transmission path is a communication transmission path, the data processing apparatus is a server apparatus configured to deliver the content, and the another data processing apparatus is a client apparatus configured to reproduce the content delivered from the server apparatus via communication.

(8)

The data processing apparatus according to any one of (1) through (5) above, in which the data processing apparatus and the another data processing apparatus are arranged in a same device and are interconnected via a predetermined interface.

(9)

A data processing method for a data processing apparatus, including the steps of:

receiving a digital broadcast signal;

processing content included in the digital broadcast signal and clock information included therein for use in presentation synchronization on the content; and sending the clock information along with the content to another data processing apparatus that presents the content via a transmission path;

the steps being all executed by the data processing apparatus.

(10)

A data processing apparatus including:

a receiving block configured to receive content sent from another data processing apparatus capable of receiving a digital broadcast signal, the content being included in the digital broadcast signal, and clock information included therein for use in presentation synchronization on the content via a transmission path; and a processing block configured to process presentation synchronization on the content on the basis of the clock information.

(11)

The data processing apparatus according to (10) above, in which a clock information descriptor including the clock information is included in a preamble of a physical layer frame included in the digital broadcast signal.

(12)

The data processing apparatus according to (11) above, in which the clock information descriptor includes compressed clock information obtained by compressing the clock information.

(13)

The data processing apparatus according to (11) or (12) above, in which the clock information is one of information of a clock time specified by PTP and information of a clock time specified by NTP.

(14)

The data processing apparatus according to (13) above, in which the clock information is information of a clock time specified by the PTP, and the processing block transfers a message with another processing block that processes the clock information in the another data processing apparatus, thereby causing the clock information to be corrected in accordance with a transmission delay.

(15)

The data processing apparatus according to any one of (10) through (14) above, in which the transmission path is a broadcasting transmission path, the another data processing apparatus is a redelivery apparatus configured to redeliver the content, and the data processing apparatus is a reproducing apparatus configured to reproduce the content redelivered from the redelivery apparatus via broadcasting.

(16)

The data processing apparatus according to any one of (10) through (14) above, in which the transmission path is a communication transmission path, the another data processing apparatus is a server apparatus configured to deliver the content, and the data processing apparatus is a client apparatus configured to reproduce the content delivered from the server apparatus via communication.

(17)

The data processing apparatus according to any one of (10) through (14) above, in which the data processing apparatus and the another data processing apparatus are arranged in a same device and are interconnected via a predetermined interface.

(18)

A data processing method for a data processing apparatus, including the steps of:

receiving content sent from another data processing apparatus capable of receiving a digital broadcast signal, the content being included in the digital broadcast signal, and clock information included therein for use in presentation synchronization on the content via a transmission path; and processing presentation synchronization on the content on the basis of the clock information;

the steps being executed by the data processing apparatus.

REFERENCE SIGNS LIST

1 Transmission system, 10 Sending system, 20 Receiving system, 30 Transmission path, 111 Component processing block, 112 Signaling processing block, 113 Clock information processing block, 114 Packet processing block, 115 Modulation processing block, 116 RF block, 211 Master apparatus, 212 Slave apparatus, 213 Network, 221 RF block, 222 Demodulation processing block, 223 Packet processing block, 224 Clock information master block, 225 Network I/F, 231 Network I/F, 232 Clock information slave block, 233 Decode processing block, 234 Output block, 900 Computer, 901 CPU

The invention claimed is:

1. A data processing apparatus comprising:
circuitry configured to:
receive a digital broadcast signal;
process content included in the digital broadcast signal and time information included therein for use in presentation synchronization on the content; and
send the time information and the content to another data processing apparatus that presents the content via a transmission path, wherein the time information is included in L1 signaling in a physical layer frame and the time information is recorded in the data processing apparatus.

2. The data processing apparatus according to claim 1, wherein a time information descriptor including the time information is included in a preamble of a physical layer frame included in the digital broadcast signal.

3. The data processing apparatus according to claim 2, wherein the time information descriptor includes compressed time information obtained by compressing the time information.

4. The data processing apparatus according to claim 2, wherein the time information is one of information of a time specified by PTP (Precision Time Protocol) and information of a clock time specified by NTP (Network Time Protocol).

5. The data processing apparatus according to claim 4, wherein the time information is information of a clock time specified by the PTP, and the circuitry is further configured to transfer a message with other circuitry that processes the time information in the another data processing apparatus, thereby correcting the time information processed by the another data processing apparatus accordance with a transmission delay.

6. The data processing apparatus according to claim 1, wherein the transmission path is a broadcasting transmission path, the data processing apparatus is a redelivery apparatus configured to redeliver the content, and the another data processing apparatus is a reproducing apparatus configured to reproduce the content redelivered from the redelivery apparatus via broadcasting.

7. The data processing apparatus according to claim 1, wherein the transmission path is a communication transmission path, the data processing apparatus is a server apparatus configured to deliver the content, and the another data processing apparatus is a client apparatus configured to reproduce the content delivered from the server apparatus via communication.

8. The data processing apparatus according to claim 1, wherein the data processing apparatus and the another data processing apparatus are arranged in a same device and are interconnected via an interface.

9. The data processing apparatus according to claim 5, wherein the transmission path is a communication transmission path, the another data processing apparatus is a server apparatus configured to deliver the content, and the data processing apparatus is a client apparatus configured to reproduce the content delivered from the server apparatus via communication.

10. The data processing apparatus according to claim 5, wherein the data processing apparatus and the another data processing apparatus are arranged in a same device and are interconnected via an interface.

11. The data processing apparatus according to claim 1, wherein the time information is information of a clock time specified by NTP (Network Time Protocol).

12. The data processing apparatus according to claim 1, wherein the time information is information of a clock time specified by 3GPP (Third Generation Partnership Project).

13. The data processing apparatus according to claim 1, wherein the time information is information of a clock time specified by GPS (Global Positioning System).

14. The data processing apparatus according to claim 1, wherein the time information is sent in a Sync message.

15. The data processing apparatus according to claim 14, wherein the Sync message is recorded in the data processing apparatus.

16. The data processing apparatus of claim 1, wherein the time information in the digital broadcast signal is of a first format.

17. The data processing apparatus of claim 16, wherein a first receiving device comprises a demodulator block from which the time information is processed to include a delay response factored therein as the first receiving device relays the processed time information to a second receiving device.

18. The data processing apparatus of claim 16, wherein a first receiving device comprises a demodulator block and a processor block through which the time information is processed to include a delay response factored therein as the first receiving device relays the processed time information to a second receiving device.

19. The data processing apparatus of claim 16, wherein the first format comprises clock information in at least a 0:00 second, month, day, and year time presentation.

20. The data processing apparatus of claim 16, wherein the processed time information is in the first format but represent clock information with a time delay added thereto.

21. The data processing apparatus of claim 20 wherein the first format comprises clock information in at least a 0:00 second, month, day, and year time presentation format.

22. The data processing apparatus of claim 16 wherein the first format is precision time protocol.

23. The data processing apparatus of claim 22 wherein a first receiving device comprises a demodulator block from which the time information is processed to include a delay response factored therein as the first receiving device relays the processed time information to a second receiving device; and
wherein clock information is in at least a 0:000000000 second, month, day, and year time presentation format.

24. The data processing apparatus of claim 22 wherein a first receiving device comprises a demodulator block and a processor block through which the time information is processed to include a delay response factored therein as the first receiving device relays the processed time information to a second receiving device; and
wherein clock information is in at least a 0:000000000 second, month, day, and year time presentation format.

25. The data processing apparatus of claim 1, wherein the time information including information of UTC offset to allow conversion of PTP (Precision Time Protocol) into UTC.

26. The data processing apparatus of claim 1, wherein the time information including compressed PTP (Precision Time Protocol) and a second field is 32 bits.

27. The data processing apparatus of claim 4, wherein the PTP of a format specified in IEEE1588.

28. The data processing apparatus of claim 26, wherein the PTP of IEEE1588 is corresponding to a clock time with 0:00, Jan. 1, 1970 of TAI being an epoch.

29. The data processing apparatus of claim 4, wherein the PTP specifies a second field of 48 bits corresponding to a clock time in units of seconds and a nanosecond field of 32 bits indicative of a clock time in units of nanoseconds.

* * * * *